(No Model.)

M. A. CHAMBERLAIN.
WEED CUTTER FOR LISTED CORN.

No. 473,912. Patented May 3, 1892.

Witnesses:
John A. Morrison
Chas. J. Stillman

Inventor:
M. A. Chamberlain by
H. W. Stackpole
His Atty.

UNITED STATES PATENT OFFICE.

MANASSEH A. CHAMBERLAIN, OF KEATS, KANSAS.

WEED-CUTTER FOR LISTED CORN.

SPECIFICATION forming part of Letters Patent No. 473,912, dated May 3, 1892.

Application filed September 8, 1891. Serial No. 405,107. (No model.)

*To all whom it may concern:*

Be it known that I, MANASSEH A. CHAMBERLAIN, a citizen of the United States, residing at Keats, in the county of Riley and State of Kansas, have invented certain new and useful Improvements in Weed-Cutters for Listed Corn; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in weed-cutters for listed corn; and the objects are to provide an implement which shall be simple, cheap, light-running, easily operated, and while effectually cutting the weeds shall at the same time stir the soil near the plants. These objects I attain by means of the mechanism hereinafter described, and illustrated in the accompanying drawings, in which—

Figure 1:
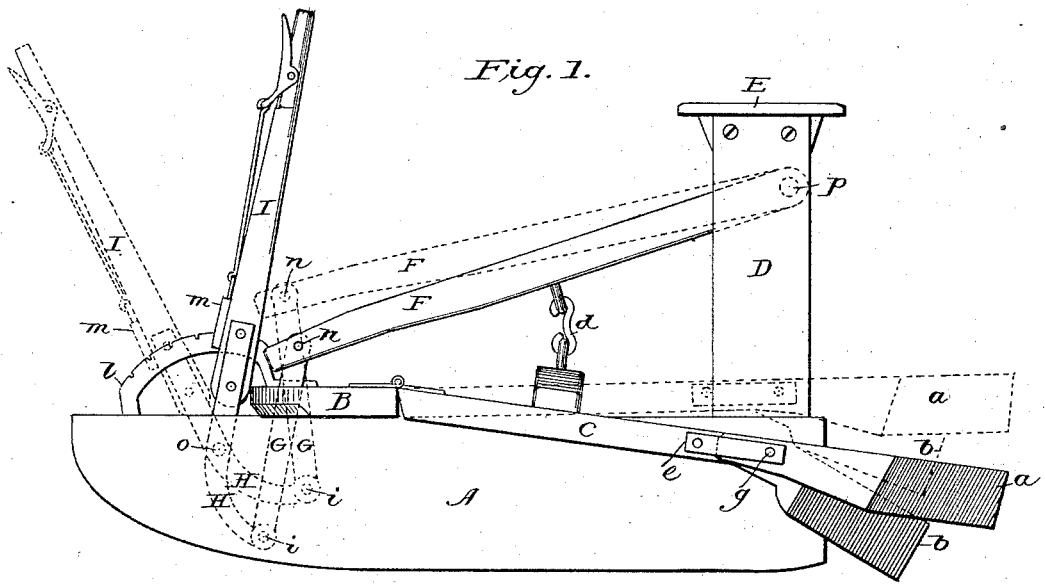
Figure 2:
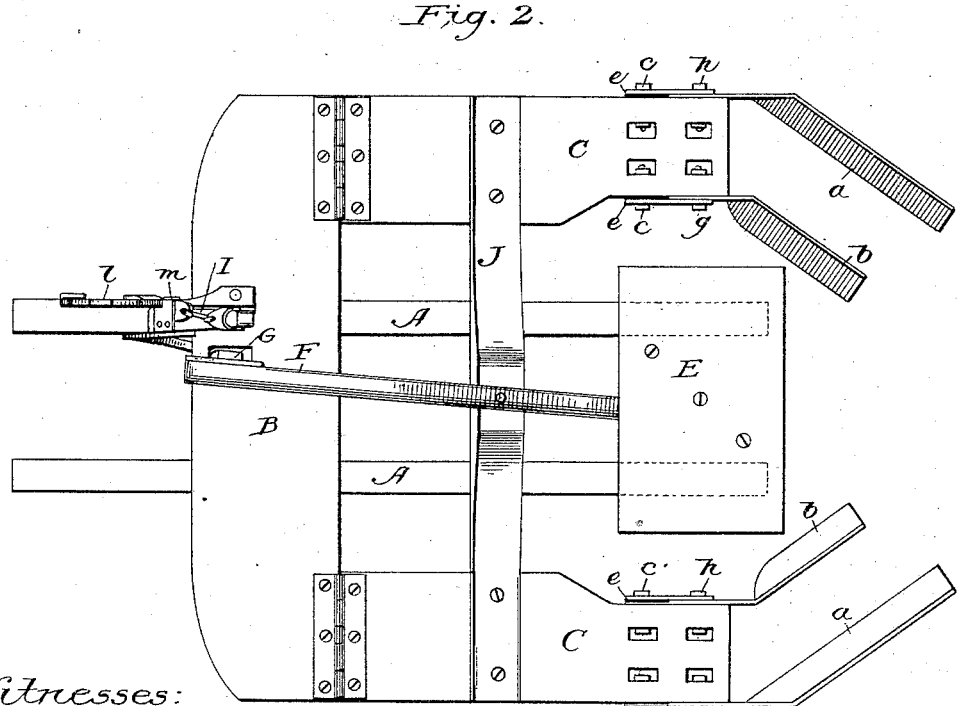

Figure 1 is a side elevation of my invention, and Fig. 2 a plan of same.

Similar letters of reference refer to corresponding parts.

A A are runners; B, a cross-head; C C, shovel-beams; D, standards; E, a seat; F, a lever having its fulcrum at $p$ in the standard D; G, the connecting-arm between lever F and handle I, pivoted at $n$ and $i$. Handle I is pivoted to the runner at $o$. Shovel-beams C C are hinged to cross-head B and connected with each other by means of cross-bar J, which is connected by means of a coupling-link $d$ or other free joint with lever F. Knives $a$ and $b$ are secured to shovel-beams C C by means of bolts $g$ $c$ and $h$ $c$, passing through plate $e$, and which to facilitate the separate adjustment of said knives extend only part way through the shovel-beams into slots cut therein for the purpose of admitting nuts to be secured to said bolts. Said knives are bent inward to form an obtuse angle of about forty-five degrees with the shovel-beams, the lower or cutting edge of said knives being approximately straight and extending farther forward than the upper edge or back of same, thus throwing the inner surface or face thereof upward and causing it to cut instead of scrape, and at the same time stir the soil. It will now be readily seen that by pushing handle I forward the knives are raised, as shown by dotted lines in Fig. 1, and pawl $m$, engaging ratchet $l$, holds them in the desired position.

I propose to attach wheels by cutting from the forward end about one-third of the length of said runners and properly securing the several parts now attached thereto to an axle, the wheels to be so placed as to run directly in front of the runners, thus leveling the soil and rubbish and forming a track for said runners, which will considerably lighten the draft and avoid clogging with trash; but for this I make no claim.

Having thus described my invention, what I claim as new, and desire to secure by Letters Patent, is—

1. In a weed-cutter for listed corn, the knives bent inward to form an obtuse angle, the lower or cutting edge thereof being approximately straight and extending farther forward than the upper edge or back of same, thus throwing the inner surface or face upward, substantially as shown and described.

2. In a weed-cutter for listed corn, the hinged shovel-beams having attached thereto the inwardly-bent knives $a$ and $b$, and connected by a cross-bar, to which is secured the lever F for raising and lowering the same, substantially as shown and described.

3. In a weed-cutter for listed corn, the combination, with the cross-head B, of the hinged shovel-beams C C, cross-bar J, knives $a$ and $b$, and means for raising and lowering the same, substantially as shown and described.

In testimony whereof I affix my signature in presence of two witnesses.

MANASSEH A. CHAMBERLAIN.

Witnesses:
T. SCOTT MORRISON,
E. E. HOOPES.